Figure 1:
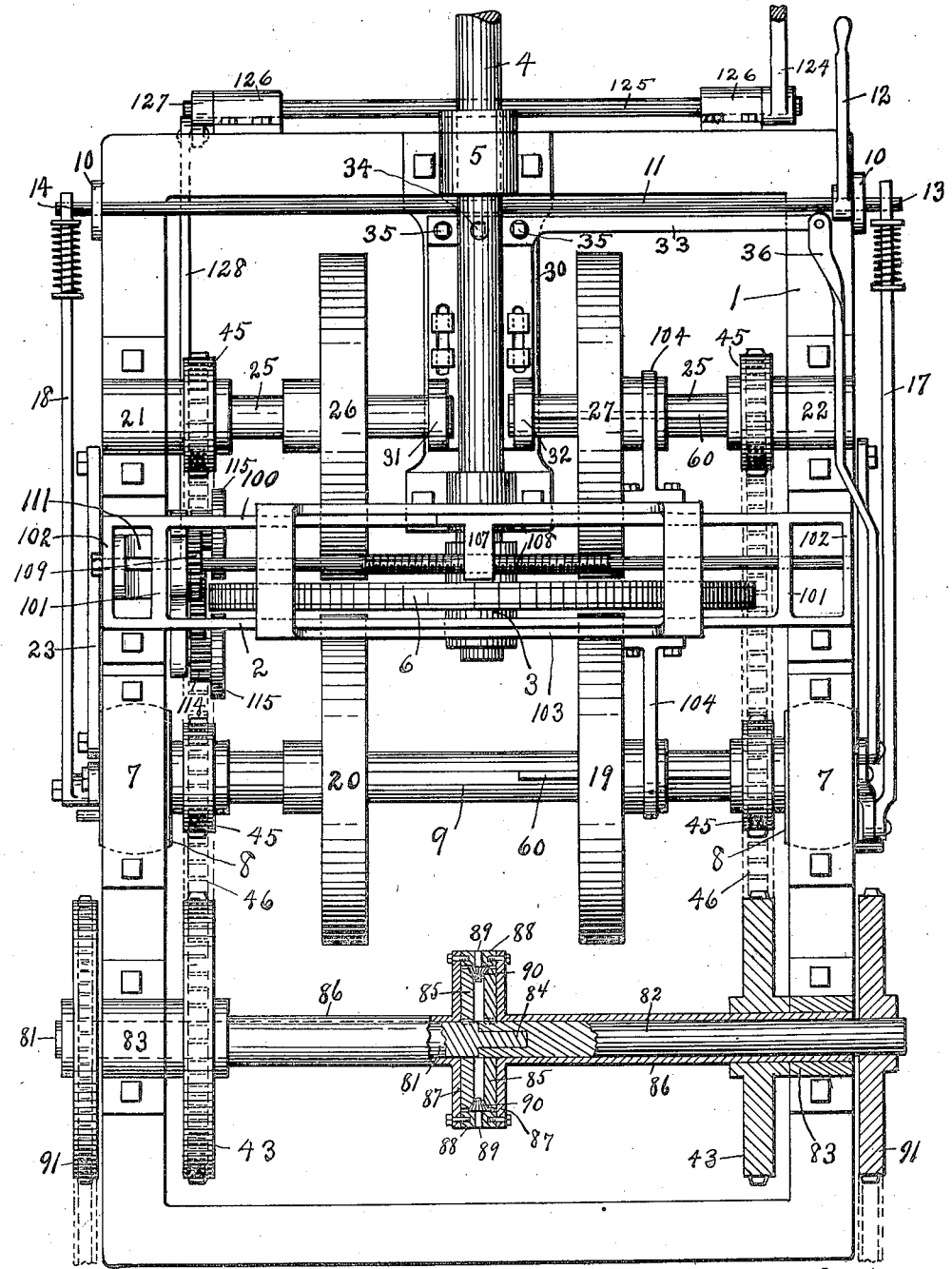

W. J. SEITZ.
SPEED CONTROLLER.
APPLICATION FILED FEB. 3, 1908.

922,525.

Patented May 25, 1909.

3 SHEETS—SHEET 1.

Witnesses
O. B. Baenziger.
E. M. Brown.

Inventor
W. J. Seitz.
By Edward N. Pagelsen, Attorneys

W. J. SEITZ.
SPEED CONTROLLER.
APPLICATION FILED FEB. 3, 1908.
922,525.
Patented May 25, 1909.
3 SHEETS—SHEET 2.
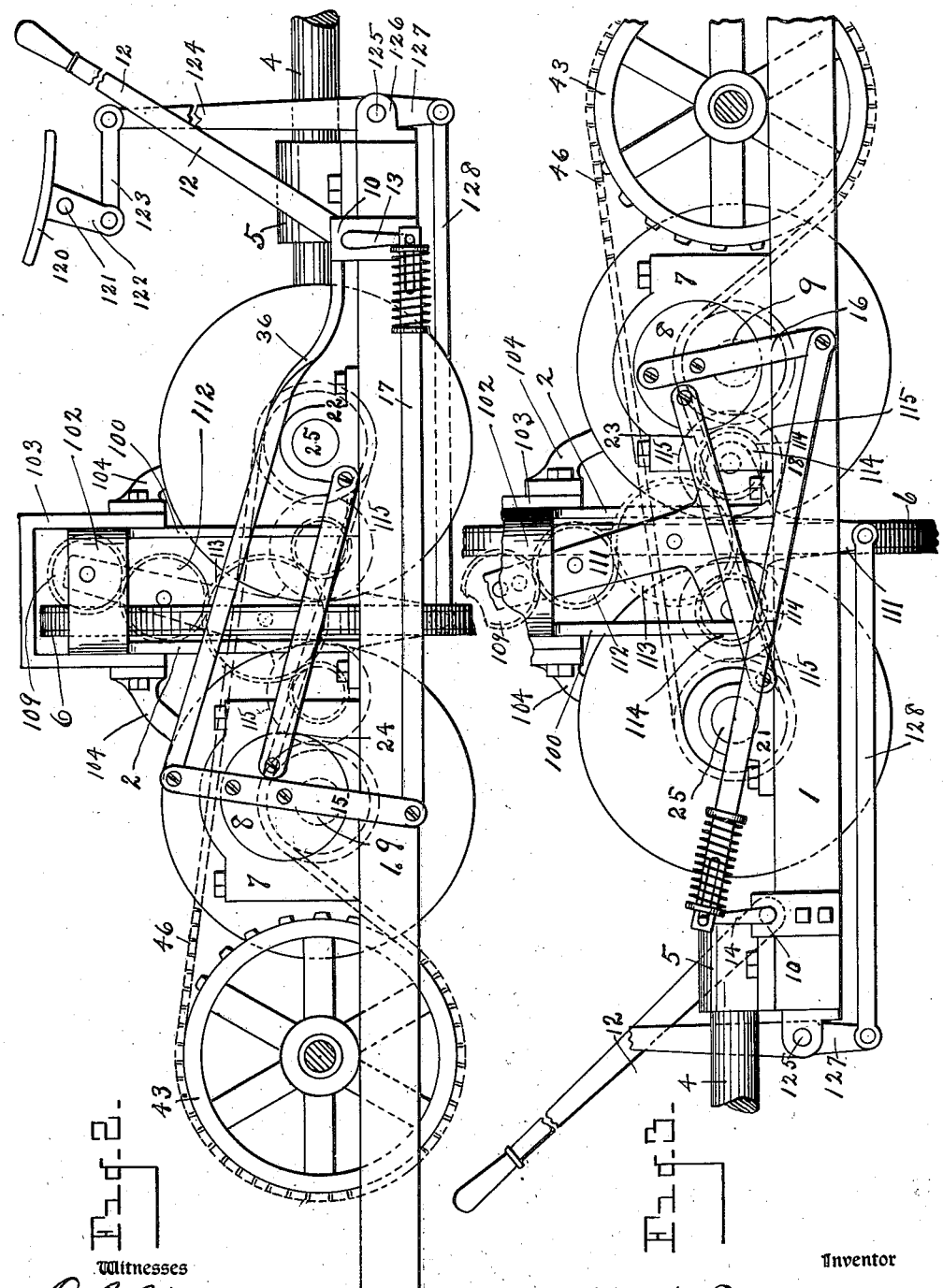

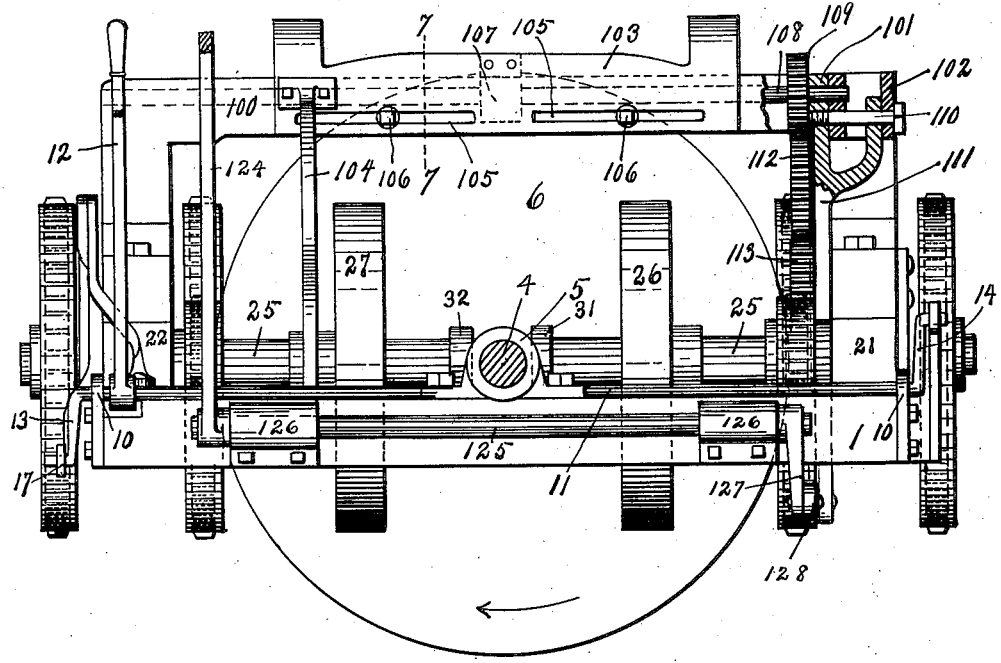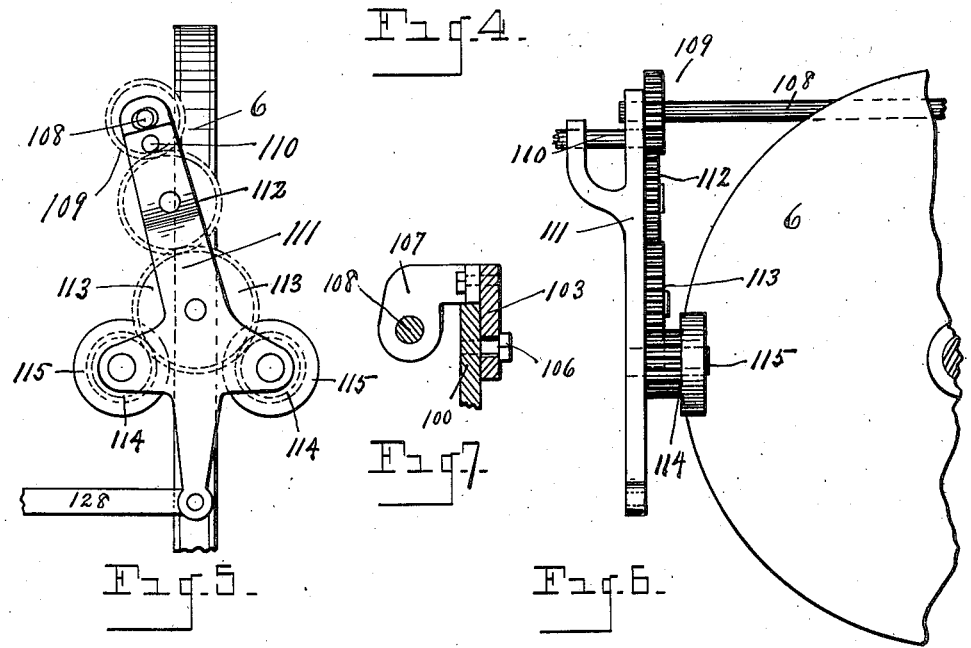

UNITED STATES PATENT OFFICE.

WILLIAM J. SEITZ, OF GRAPE, MICHIGAN.

SPEED-CONTROLLER.

No. 922,525.  Specification of Letters Patent.  Patented May 25, 1909.

Application filed February 3, 1908. Serial No. 413,958.

To all whom it may concern:

Be it known that I, WILLIAM J. SEITZ, a citizen of the United States, residing at Grape, in the county of Monroe and State of Michigan, have invented a new and useful Speed-Controller, of which the following is a specification.

My invention relates to means for controlling frictional change-speed gearing adapted for use on motor driven vehicles and boats, and in connection with machines where changes in speed and direction of movement are necessary.

My present invention consists of means adapted to be employed in connection with that type of frictional gearing shown and described in my former patent dated Feb. 12th, 1907, Serial Number 843,634, for frictional gearing.

My invention consists more particularly in frictionally driven means for changing the relative positions of a friction wheel and of a friction disk so as to change their relative speeds, which shifting means embodies a screw, toothed gears for driving the same, and a pair of friction wheels for driving the toothed gears, which friction wheels are so mounted that one or the other may contact with the driving disk and thus drive the screw in either direction at will.

My invention is illustrated in the accompanying drawings, in which—

Figure 1 is a plan, Fig. 2 is a view of the right side and Fig. 3 is a view of the left side of my improved friction gear and of my improved speed controlling mechanism attached thereto. Fig. 4 is a view of the front end of the frictional gear and its attached controller. Fig. 5 is a side view and Fig. 6 is a rear view of the gearing that drives the shifting screw. Fig. 7 is a cross section of the shifter on the line 7—7 of Fig. 4.

Similar reference characters refer to like parts throughout the several views.

The motor driven shaft 4 is mounted in bearings 3 carried by the cross bars 2 attached to the frame 1 and in a bearing 5 attached directly to this frame. The friction disk 6 is secured to this shaft. On the rear side of the disk is the shaft 9 whose ends are journaled in the eccentric bearings 8 mounted in the boxes 7. The shafts 25 at the front side of the disk 6 have their outer ends journaled in the slidably mounted bearings 21 and 22, and their inner ends in the bearings 31 and 32 slidably mounted on the plate 30.

A shaft 11 extends across the front of the frame through the bearings 10 and is adapted to be turned by means of the lever 12. At the right end of the shaft 11 is an arm 13 which engages one end of the link 17. This link connects to the lever 15 secured to the eccentric 8, so that the swinging of the lever 12 will move the right end of the shaft 9 toward or away from the front of the machine. On the left end of the shaft 11 is another arm 14, which engages one end of the link 18, the other end of which connects to the lower end of the lever 16 secured to the eccentric bearing 8 on the left side of the machine. This mechanism serves to move the left end of the shaft 9 in directions opposite to those of the right end, when the shaft 11 is swung by means of the lever 12. A link 23 connects the bearing 8 on the left side of the machine to the outer bearing 21 of the shaft 25, and a link 24 connects the bearing 8 on the right side of the machine to the outer bearing 22 of the shaft 25. The links 23 and 24 connect to these eccentric bearings 8 on opposite sides of their centers from the bearings of the shaft 9, the corresponding ends of the shafts 9 and one shaft 25 will therefore be moved simultaneously either toward or from the disk 6, while at the same time the opposite end of the shaft 9 and the outer end of the other shaft 25 will be moved in opposite directions.

In order to move the inner ends of the shafts 25, toward and from the friction disk 6 simultaneously with the outer ends of the same shafts, I pivot the lever 33 on the bolt 34 secured to the plate 30, and connect this lever to the bearings 31 and 32 by means of the bolts 35. At the free end of the lever is connected the link 36 which connects to the upper end of the lever 15. The free end of the lever will therefore move in the same direction as the bearing 22, and contrary to the bearing 21.

Secured to the shaft 9 and to the left shaft 25 are the friction wheels 20 and 26. Slidably mounted on the shaft 9 on the other side of the center of the disk 6 is the wheel 19, which is held from turning on its shaft by the feather 60. A similar feather 60 prevents the friction wheel 27 from turning on the right shaft 25. Gears 45 are secured to the shafts 25 and 9.

A differential driving mechanism may be mounted on the frame 1 and constructed as follows. Shafts 81 and 82 are mounted in sleeves 86 and carry transmission gears 91 of any desired type on their outer ends. A stud 84 of one fits into a socket in the inner end of the other to keep them in line. Bevel gears 85 are secured to the inner ends of these shafts. In bearings 83 are mounted the sleeves 86 having disks 87 at their inner ends which connect to the ring 88. Pins 89 carried by this ring 88 have mounted thereon the bevel pinions 90. Secured on the sleeves 86 are the gears 43 which are driven by the chains 46 connecting to the gears 45.

The mechanism just described operates as follows. The duplication of parts on this machine is for safety and easy running. The shell or ring 88 will carry the pinions 90 around, and so long as there is equal stress on the wheels 91 will turn the gears 85 at equal speeds. But should one wheel 91 be under a greater load than the other, the turning of the pinions 90 will permit it to lag behind.

To move the wheels 19 and 27 across the face of the disk 6, the mechanism described below is employed.

Extending upward from the main frame are two guides 2 and 100, connected by cross bars 101 and 102. Slidable on these guides is the shifter frame 103 which carries downwardly extending arms 104 which have forked ends fitting in grooves in the hubs of the wheels 19 and 27. These grooves are deep enough to permit the movement of the wheels 19 and 27 toward and from the disk 6 without disengaging the forked ends of the arms 104. The shifter frame has slots 105 through which pass the screws 106 that extend into the guides 2 and 100 and thus support the shifter. Secured to the inner side of the front bar of the shifter frame, is the nut 107 which fits on the screw 108, which screw is journaled in the cross bars 101 and 102 between the guides 2 and 100. Mounted on, near the left end of the screw, is a gear 109. A pivot pin 110 is secured in the left cross bars 101 and 102 and carries the upper forked end of the gear carrier 111. This gear carrier supports pins upon which are revolubly mounted the gear 112 meshing with the gear 109 on the screw, the third gear 113 meshing with gear 112, and the pair of gears 114, that mesh with the gear 113. To each gear 114 is secured a friction wheel 115, which are positioned on opposite sides of the friction disk 6, and separated sufficiently to permit the disk to revolve freely between them. Any movement of the gear carrier toward the front or rear will cause either the front or rear friction wheel 115 to contact with this disk, and, with the engine running in the direction of the arrow in Fig. 4, will cause the speed of the rear axle to increase or decrease, as the rear or front wheel 115 respectively contacts with the disk.

To operate this speed changing device I mount a treadle 120 on the pivot 121 carried by any desired portion of the machine. The arm 122 extends down and connects with a link 123 pivoted to the upper end of the lever 124. This lever is mounted on one end of the shaft 125, which shaft is journaled in the bearings 126 on the frame 1. The opposite end of the shaft carries an arm 127 which connects to the lower end of the gear carrier 111 by means of the link 128. Thus by tipping down the front end of the treadle 120, the lower end of the gear carrier is forced forward, the rear friction wheel 115 contacts with the friction disk 6 and the carriage 103 moves to the left, thus carrying in the friction wheels 19 and 27. Depressing the rear portion of the treadle 120 will cause the wheels 19 and 27 to be moved from the center of the disk 6. It will therefore be seen that the speed of the wheels 91 is controlled by the movement of the treadle 120; that the speed of the wheels 91 may be changed while the wheels 19 and 27 are in contact with the disk 6; that the position of these wheels may be changed when the vehicle is standing still or when backing up under the action of the wheels 20 and 26. The starting speed of the vehicle can be determined before the vehicle starts and its speed can be increased or decreased while the vehicle is running forward. While the position of the lever 12 determines whether the vehicle shall run forward, backward or stand still, the speed forward can be fixed or changed at will by the operation of the treadle 120.

Having now explained my improvements, what I claim as my invention is:—

1. In a friction-drive mechanism, the combination of a friction disk, a wheel adapted to contact therewith and be actuated thereby, and means adapted to be driven by said friction disk independently of the wheel to change the relative position of the friction disk and wheel.

2. In a friction-drive mechanism, the combination of a constantly running driving member, a driven member adapted to be brought in engagement therewith, and means adapted to be actuated by the driving member to change the position of the driven member irrespective of whether the driven member is in engagement with the driving member or not.

3. In a friction-drive mechanism, the combination of a constantly running friction disk, a friction wheel adapted to be brought into engagement therewith, and means adapted to be actuated by the friction disk to move the friction wheel in or out across the face of the disk at the will of the operator irrespective of whether the friction wheel is in engagement with the friction disk or not.

4. In a friction-drive mechanism, the combination of a driving friction disk, a shaft mounted across the face of the same, a friction wheel slidably mounted on said shaft, means to move the shaft to carry the wheel into and out of engagement with the disk, and means adapted to engage the friction disk to cause said wheel to move in and out across the face of the disk at the will of the operator whether engaged or disengaged with the face of the disk.

5. In a friction-drive mechanism, the combination of a two faced driving friction disk, a shaft mounted across each face of the disk, a friction driving wheel slidably mounted on each shaft, means to move the shafts so as to simultaneously carry the wheels into or out of engagement with the disk, a carriage movable parallel with the faces of the disks, arms on said carriage to engage the wheels so as to move them along their shafts with the movements of the carriage, a screw to move said carriage back and forth, a gear carrier, two friction wheels mounted thereon each adapted to be moved into engagement with one of the faces of the friction disk, gears between the friction wheels and the screw, and means to move said gear carrier whereby the carriage will be caused by the friction disk to slide said driving wheels across the face of the disk in either direction at the will of the operator, irrespective of whether they be in contact with the disk or not.

In testimony whereof I have signed this specification in the presence of two subscribing witnesses.

WILLIAM J. SEITZ.

Witnesses:
J. H. RUSSELL,
ZAY SIPPERLEY.